United States Patent
Komatsu

(10) Patent No.: US 10,898,983 B2
(45) Date of Patent: Jan. 26, 2021

(54) DRESSING METHOD OF CUTTING BLADE

(71) Applicant: DISCO CORPORATION, Tokyo (JP)

(72) Inventor: Atsushi Komatsu, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 286 days.

(21) Appl. No.: 16/233,783

(22) Filed: Dec. 27, 2018

(65) Prior Publication Data
US 2019/0202018 A1    Jul. 4, 2019

(30) Foreign Application Priority Data

Dec. 28, 2017  (JP) .................................. 2017-254125

(51) Int. Cl.
| | |
|---|---|
| B24B 53/04 | (2012.01) |
| B24B 3/36 | (2006.01) |
| B24B 3/46 | (2006.01) |
| B23D 63/14 | (2006.01) |
| B24B 53/12 | (2006.01) |
| B24B 27/06 | (2006.01) |

(52) U.S. Cl.
CPC .............. B24B 3/36 (2013.01); B23D 63/14 (2013.01); B24B 3/46 (2013.01); B24B 53/04 (2013.01); B24B 53/12 (2013.01); B24B 27/0608 (2013.01)

(58) Field of Classification Search
CPC .. B24B 3/36; B24B 3/46; B24B 53/04; B24B 53/12; B24D 15/06; B23D 63/08; B23D 63/14
USPC .................. 451/45, 56, 164, 173, 321, 443
See application file for complete search history.

(56) References Cited

U.S. PATENT DOCUMENTS

| | | | | |
|---|---|---|---|---|
| 4,811,722 A | * | 3/1989 | Brehm | B24B 53/00 125/11.01 |
| 5,008,509 A | * | 4/1991 | Hattori | B23H 1/04 125/11.01 |
| 6,176,762 B1 | * | 1/2001 | Shimizu | B24B 1/00 125/11.01 |
| 10,532,415 B2 | * | 1/2020 | Kordus | B23D 63/12 |
| 10,535,562 B2 | * | 1/2020 | Tanaka | H01L 21/68714 |
| 10,668,595 B2 | * | 6/2020 | Sekiya | B24B 53/12 |
| 2016/0284611 A1 | * | 9/2016 | Sekiya | B28D 5/0064 |
| 2018/0215010 A1 | * | 8/2018 | Sekiya | B24B 53/12 |
| 2018/0366371 A1 | * | 12/2018 | Tanaka | H01L 21/78 |
| 2019/0202018 A1 | * | 7/2019 | Komatsu | B24B 3/36 |

FOREIGN PATENT DOCUMENTS

JP        2010000588 A     1/2010

* cited by examiner

Primary Examiner — Eileen P Morgan
(74) Attorney, Agent, or Firm — Greer Burns & Crain Ltd.

(57) ABSTRACT

A dressing method of a cutting blade includes a first cutting step of causing the cutting blade to cut into a dressing board held by a holding surface of a chuck table with a cutting depth that does not surpass the length of the region of roundness in the radial direction of the cutting blade to form a cut groove in the dressing board, and a second cutting step of causing the cutting blade to further cut into the groove bottom of the cut groove formed in the first cutting step with a cutting depth that does not surpass the length of the region of roundness in the radial direction of the cutting blade to carry out cutting on the groove bottom with tracing of the cut groove.

2 Claims, 7 Drawing Sheets

DRESSING METHOD OF CUTTING BLADE

BACKGROUND OF THE INVENTION

Field of the Invention

The present invention relates to a dressing method of a cutting blade that cuts a workpiece such as a semiconductor wafer.

Description of the Related Art

When a plate-shaped workpiece typified by a semiconductor wafer is divided into plural chips, a cutting apparatus including a ring-shaped cutting blade is used for example. By relatively moving the cutting blade and the workpiece while the cutting blade rotated at high speed is caused to cut into the workpiece, the workpiece can be cut along the path of this movement.

Before a workpiece is cut by using a cutting blade, dressing for arranging the shape of the cutting blade concentrically with a spindle serving as a rotation axis (shaping, roundness generation) and eliminating loading, dulling, and so forth of the blade edge is carried out by causing the cutting blade to cut into a dressing board. This corrects a rounded shape or the like of the tip of the cutting blade and a step in which precise cutting is required, such as edge trimming processing, can be carried out. The edge trimming processing is a method in which the outer circumferential part of a semiconductor wafer is cut before the semiconductor wafer is ground and thinned and thereby the outer circumferential part is prevented from having a sharp knife edge shape after the grinding processing.

Various methods have been proposed about the dressing. For example, Japanese Patent Laid-open No. 2010-588 describes a method by which a cutting blade is flatly shaped by rotating the cutting blade and moving the cutting blade in the direction parallel to the rotation axis thereof to cut a dressing board.

SUMMARY OF THE INVENTION

In the dressing, when the depth of cutting of the cutting blade into the dressing board becomes larger, the wear of the tip of the cutting blade increases. Thus, this tip changes into a shape having a curved surface and a rounded region (hereinafter, referred to also as region of roundness) is generated at the tip of the cutting blade more readily. For this reason, by repeatedly carrying out a step in which the cutting blade is caused to shallowly cut into the dressing board and the dressing board is cut, the occurrence of the region of roundness generated due to the dressing can be suppressed. However, the area of the cutting of the dressing board enlarges as the number of times of cutting devoted to dressing one cutting blade increases. That is, there is a problem that many dressing boards are necessary when suppression of the occurrence of the region of roundness is attempted through increasing the cutting step.

Furthermore, it is also possible to carry out special dressing like dressing described in Japanese Patent Laid-open No. 2010-588 in order to reduce the region of roundness and obtain a flat cutting blade. However, the method described in Japanese Patent Laid-open No. 2010-588 uses a special method of moving a cutting blade in the direction parallel to the rotation axis thereof. New software and mechanism need to be introduced in order to cause a cutting apparatus to carry out such operation, and there is a problem that the cost increases.

In view of the above-described problem, one aspect of the present invention intends to provide a simple dressing method of a cutting blade with which it is possible to save the dressing board while reducing the region of roundness at the tip of a cutting blade.

In accordance with an aspect of the present invention, there is provided a dressing method of a cutting blade in which a plate-shaped dressing board is cut by the cutting blade mounted to a spindle and the cutting blade is shaped to reduce a region of roundness at a tip of the cutting blade. The dressing method includes a first cutting step of causing the cutting blade to cut into the dressing board held by a holding surface of a chuck table with a cutting depth that does not surpass the length of the region of roundness in the radial direction of the cutting blade and relatively moving the chuck table and the cutting blade in a direction that is parallel to the holding surface and is perpendicular to the axial center of the spindle to form a cut groove in the dressing board, and a second cutting step of causing the cutting blade to further cut into a groove bottom of the cut groove formed in the first cutting step with a cutting depth that does not surpass the length of the region of roundness in the radial direction of the cutting blade and relatively moving the chuck table and the cutting blade in the direction that is parallel to the holding surface and is perpendicular to the axial center of the spindle to carry out cutting on the groove bottom with tracing of the cut groove.

Preferably, the dressing method further includes a determination step of measuring the shape of the region of roundness in the cutting blade after the second cutting step is carried out and determining to end shaping of the cutting blade if the shape of the region of roundness satisfies a predetermined condition and determining to carry out the first cutting step or the second cutting step if the shape of the region of roundness does not satisfy the predetermined condition.

In the dressing method of a cutting blade according to the one aspect of the present invention, cutting is further carried out by the second cutting step on the groove bottom of the cut groove formed in the dressing board by the first cutting step. This can carry out plural times of cutting on the same region in the dressing board. Thus, the dressing board necessary for the dressing can be saved while the region of roundness at the tip of the cutting blade is reduced. Furthermore, the chuck table is moved in the direction perpendicular to the axial center of the spindle to carry out processing feed. Therefore, special software and mechanism do not need to be used for the dressing and the dressing can be easily carried out.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1A:
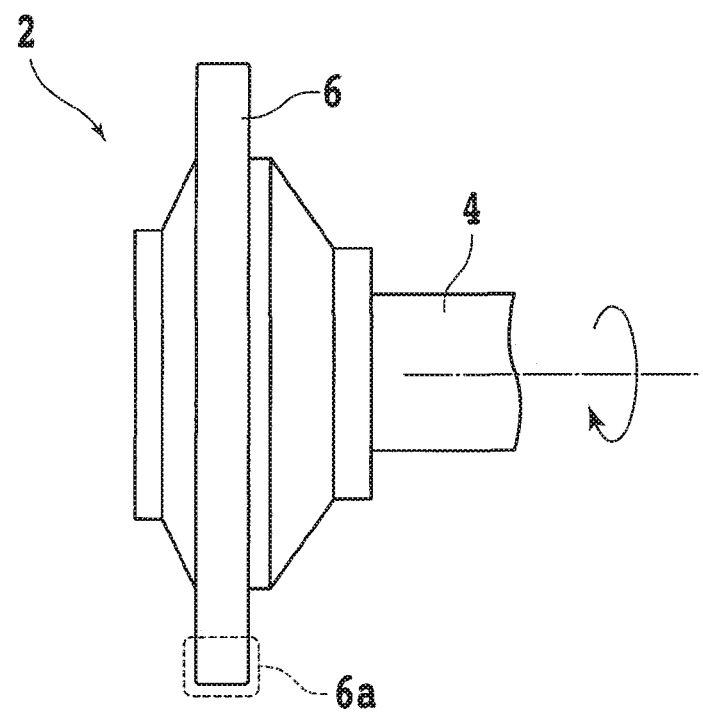
FIG. 1A is a side view schematically depicting a configuration example of a cutting unit.

An embodiment according to one aspect of the present invention will be described with reference to the accompanying drawings. First, a configuration example of a cutting unit according to the present embodiment will be described. FIG. 1A is a side view schematically depicting a configuration example of a cutting unit 2. The cutting unit 2 includes a spindle 4 serving as a rotation axis. A cutting blade 6 with a circular ring shape is mounted to one end side of the spindle 4. For example, the cutting blade 6 can be formed by fixing diamond abrasive grains by a metal, resin, or nickel plating. Dressing of the cutting blade 6 is carried out by rotating the spindle 4 and causing the cutting blade 6 to cut into a dressing board to be described later.

Figure 1B:
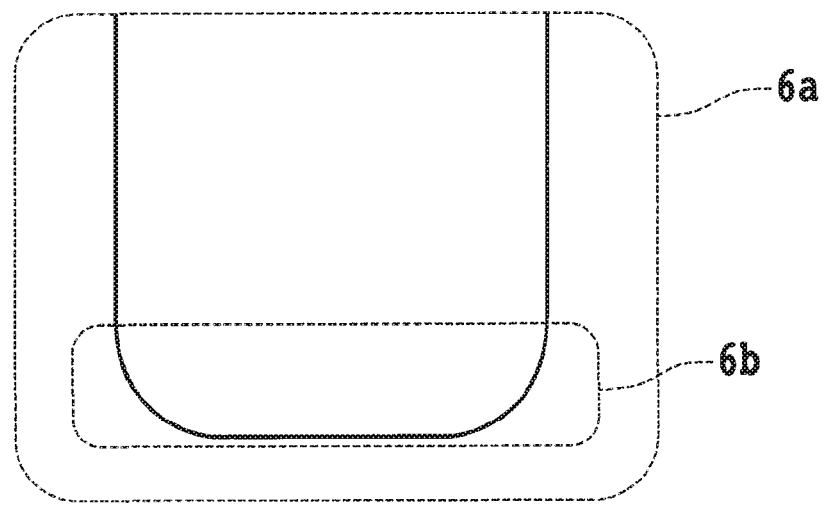
FIG. 1B is an enlarged view of a region of the tip of the cutting blade.

FIG. 1B is an enlarged view of a region 6a of the tip of the cutting blade 6. Through repetition of cutting of a workpiece by use of the cutting blade 6, the corners of the tip of the cutting blade wear off and a rounded region (region 6b of roundness) is formed as depicted in FIG. 1B. The region 6b of roundness can be defined as a region having a curved surface at the tip of the cutting blade 6 for example. When the region 6b of roundness in the cutting blade 6 becomes large, processing in which the edge of a groove formed by using the cutting blade 6 needs to be angular, or the like, like edge trimming processing for example, becomes difficult. For this reason, if precise cutting of a workpiece is required, the tip of the cutting blade 6 needs to be shaped by dressing. In particular, the cutting blade 6 obtained by fixing abrasive grains by a metal or resin readily wears and thus the necessity of shaping of the cutting blade 6 is high.

Figure 2:
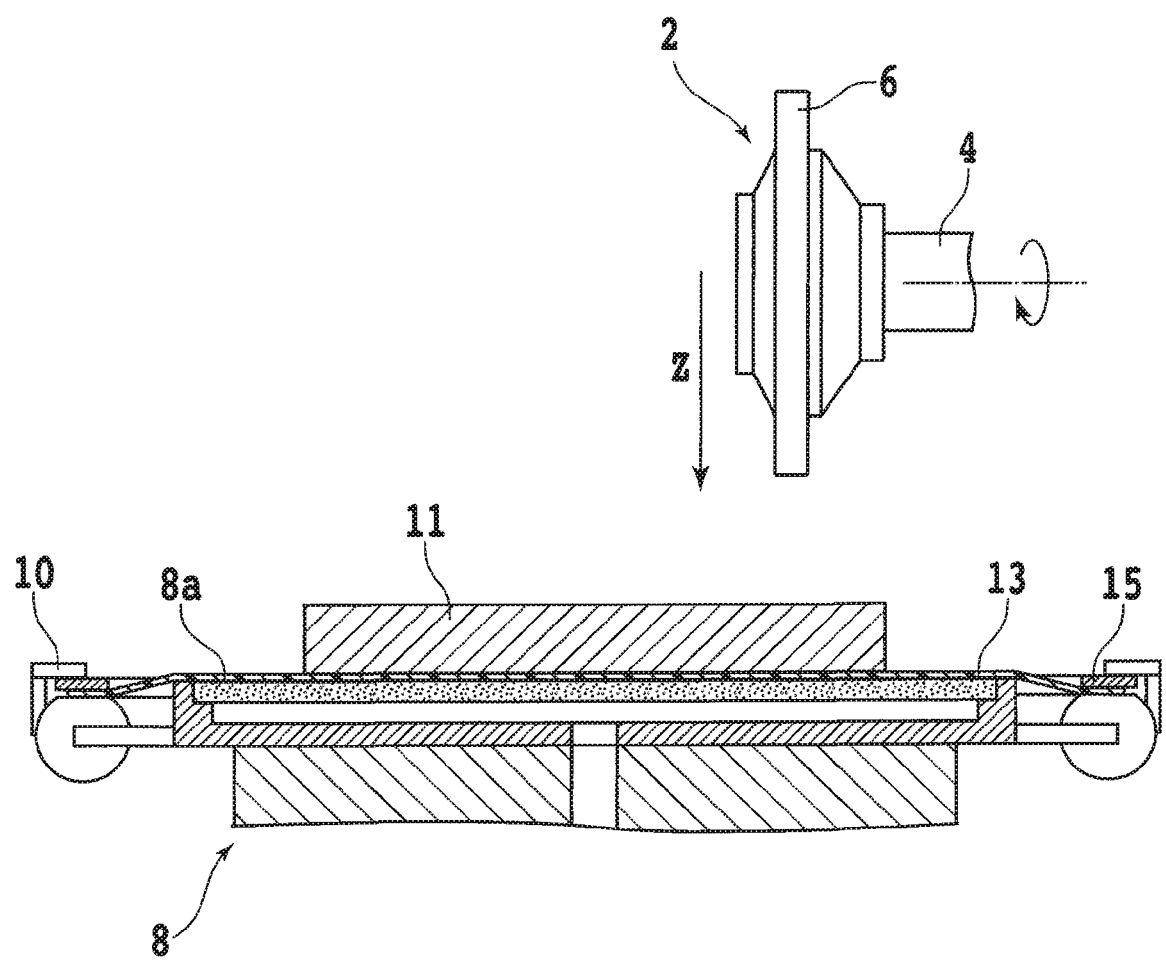
FIG. 2 is a partial sectional side view schematically depicting how dressing of the cutting blade is carried out by using a dressing board.

FIG. 2 is a partial sectional side view schematically depicting how dressing of the cutting blade 6 is carried out by using a dressing board 11. The dressing is carried out by cutting the plate-shaped dressing board 11 sucked and held by a chuck table 8 by the cutting blade 6. Specifically, first, a dicing tape 13 is brought into contact with a holding surface 8a of the chuck table 8 and a negative pressure of a suction source (not depicted) is caused to act on the dicing tape 13. In conjunction with this, a frame 15 to which the outer circumferential part of the dicing tape 13 is mounted is fixed by clamps 10. Thereby, the dressing board 11 is sucked and held by the chuck table 8. For example, the dressing board 11 is manufactured by fixing abrasive grains of white aluminum (WA), green carborundum (GC), or the like by a binding material of resin, ceramics, or the like and forming the fixed substance into a flat plate shape. There is no limit to the material, shape, structure, and so forth of the dressing board 11.

Then, while the cutting blade 6 mounted to the tip of the spindle 4 is rotated, the cutting unit 2 is lowered in the vertical direction indicated by an arrow Z to the dressing board 11 held by the chuck table 8. The cutting unit 2 is moved to a position at which the lower end of the cutting blade 6 is lower than the surface of the dressing board 11. Then, the chuck table 8 is moved in the direction that is parallel to the holding surface 8a and is perpendicular to the axial center of the spindle 4. Thereby, the cutting blade 6 cuts into the surface of the dressing board 11 and the dressing board 11 is cut, so that the cutting blade 6 is shaped.

The dressing method of a cutting blade according to the present embodiment includes a first cutting step of forming a cut groove in the dressing board 11 by the cutting blade 6 and a second cutting step of cutting the dressing board 11 with tracing of this cut groove. The first cutting step and the second cutting step will be described in detail below.

Figure 3A:
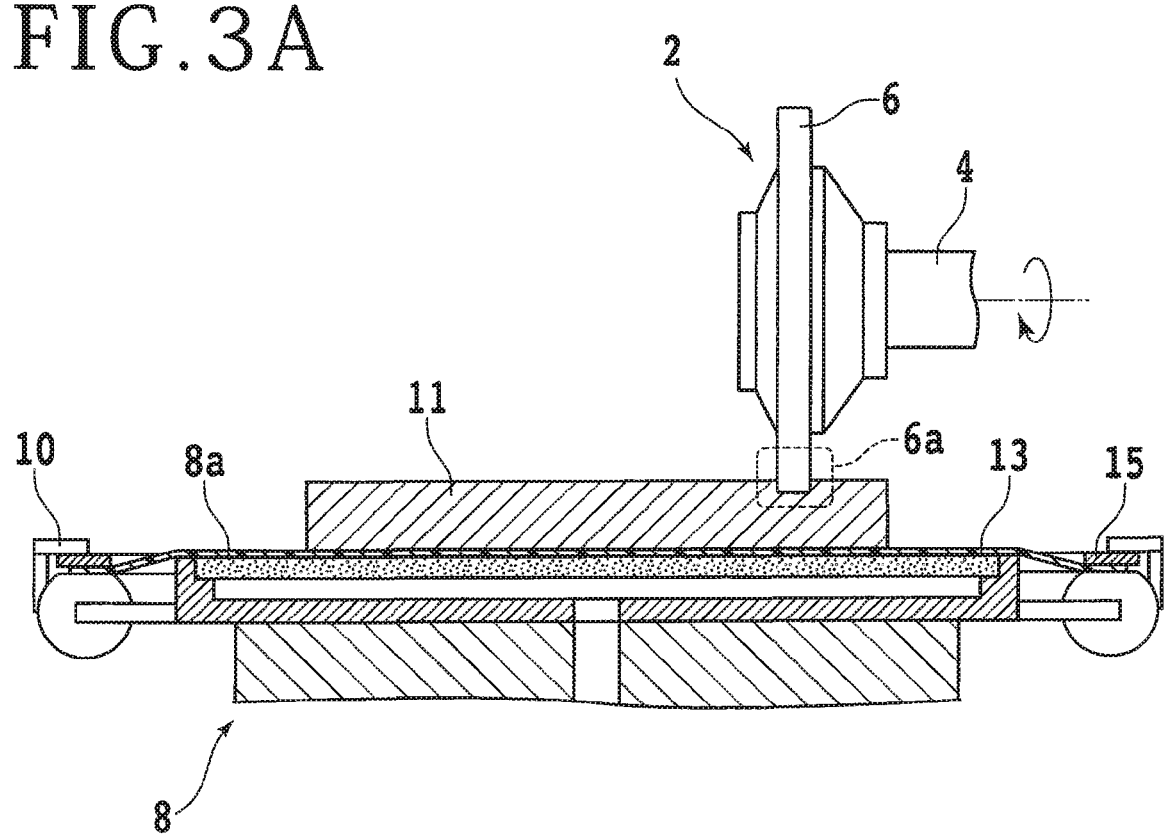
FIG. 3A is a partial sectional side view schematically depicting how a first cutting step is carried out.

FIG. 3A is a partial sectional side view schematically depicting how the first cutting step is carried out. In the first cutting step, while the spindle 4 is rotated, the cutting unit 2 is lowered to a height at which the cutting blade 6 cuts into the surface of the dressing board 11. Thereafter, a cut groove is formed in the dressing board 11 by carrying out processing feed to move the chuck table 8 in the direction that is parallel to the holding surface 8a and is perpendicular to the axial center of the spindle 4.

Figure 3B:
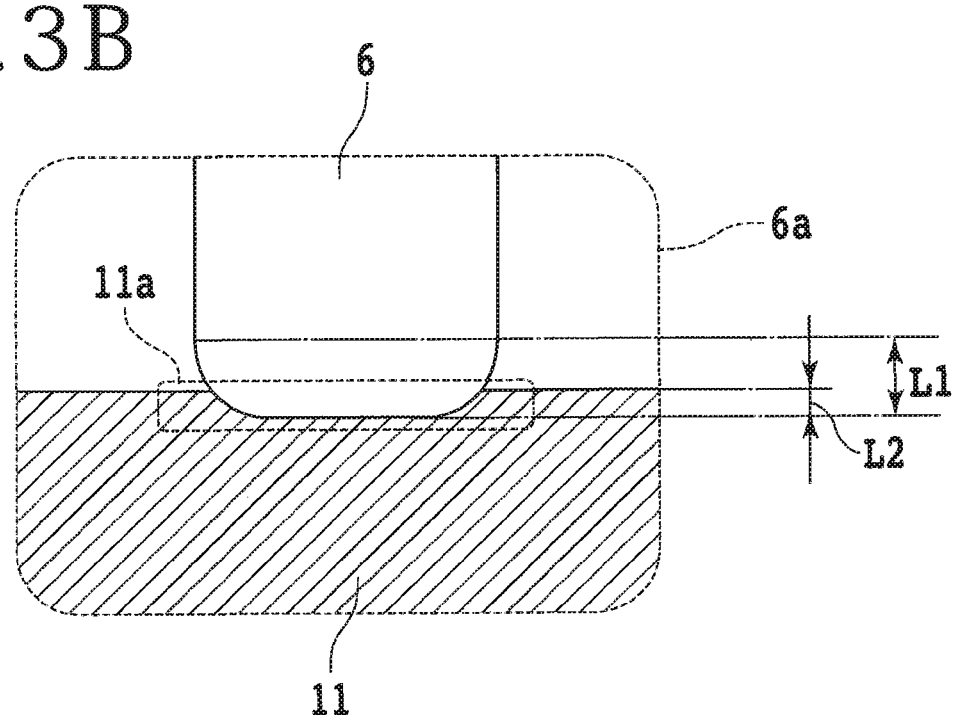
FIG. 3B is an enlarged view of a contact part between the region of the tip of the cutting blade and the dressing board in the first cutting step.

FIG. 3B is an enlarged view of a contact part between the region 6a of the tip of the cutting blade 6 and the dressing board 11 in the first cutting step. The position of the cutting unit 2 is set in such a manner that the cutting blade 6 cuts into the dressing board 11 with a cutting depth that does not surpass the length of the region of roundness in the cutting blade 6 in the radial direction of the cutting blade 6. More specifically, as depicted in FIG. 3B, the cutting unit 2 is lowered in such a manner that L1>L2 is satisfied when the length of the region of roundness in the radial direction of the cutting blade 6 is defined as L1 and the distance from the surface of the dressing board 11 to the tip of the cutting blade 6 is defined as L2. The value of L2 can be set as appropriate according to the value of L1. Furthermore, the value of L1 can be acquired by detecting the tip shape of the cutting blade 6. The method of this detection is not particularly limited. For example, the tip shape can be acquired by a method in which the cutting blade 6 is caused to cut into a workpiece to form a groove for detection and the shape of this groove for detection is imaged by imaging means, or the like. An example of the value of L2 set in this manner is approximately 1 to 50 μm.

Figure 4:
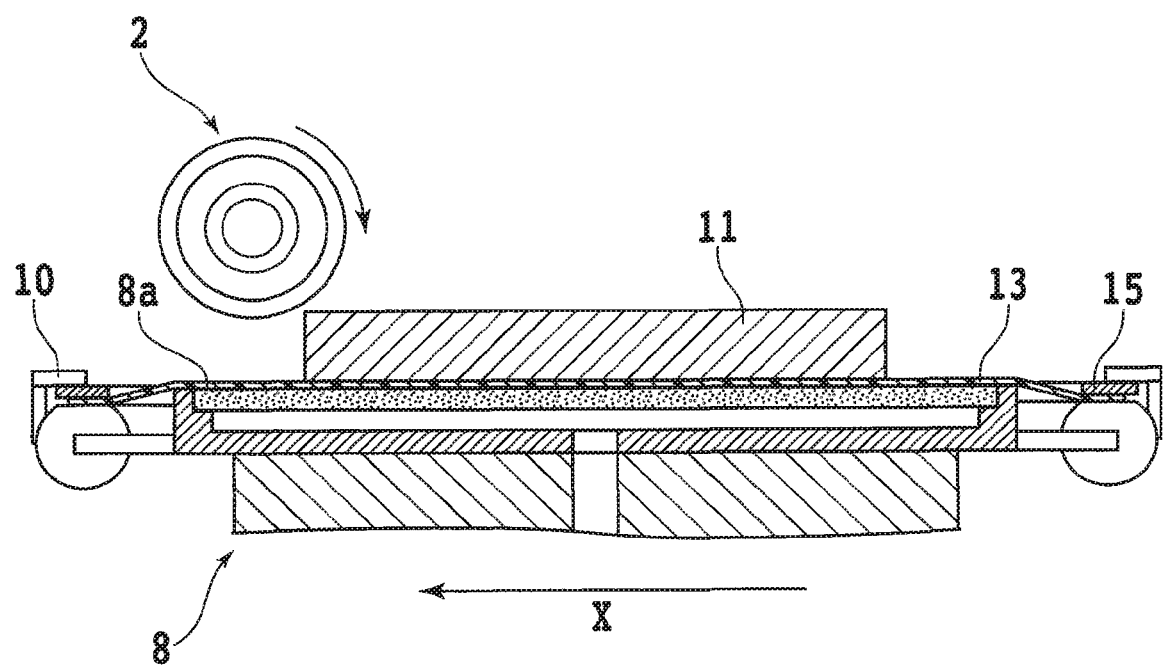
FIG. 4 is a partial sectional side view schematically depicting how the processing feed is carried out.

Thereafter, processing feed is carried out in such a manner that the surface of the dressing board 11 and the axial center of the spindle 4 relatively move. FIG. 4 is a partial sectional side view schematically depicting how the processing feed is carried out. As depicted in FIG. 4, the chuck table 8 is relatively moved in a horizontal direction indicated by an arrow X, i.e. in the direction that is parallel to the holding surface 8a and is perpendicular to the axial center of the spindle 4. Thereby, the dressing board 11 is cut and dressing of the cutting blade 6 is carried out. Furthermore, a cut groove 11a depicted in FIG. 3B is formed in a straight line manner in the surface of the dressing board 11.

Figure 5A:
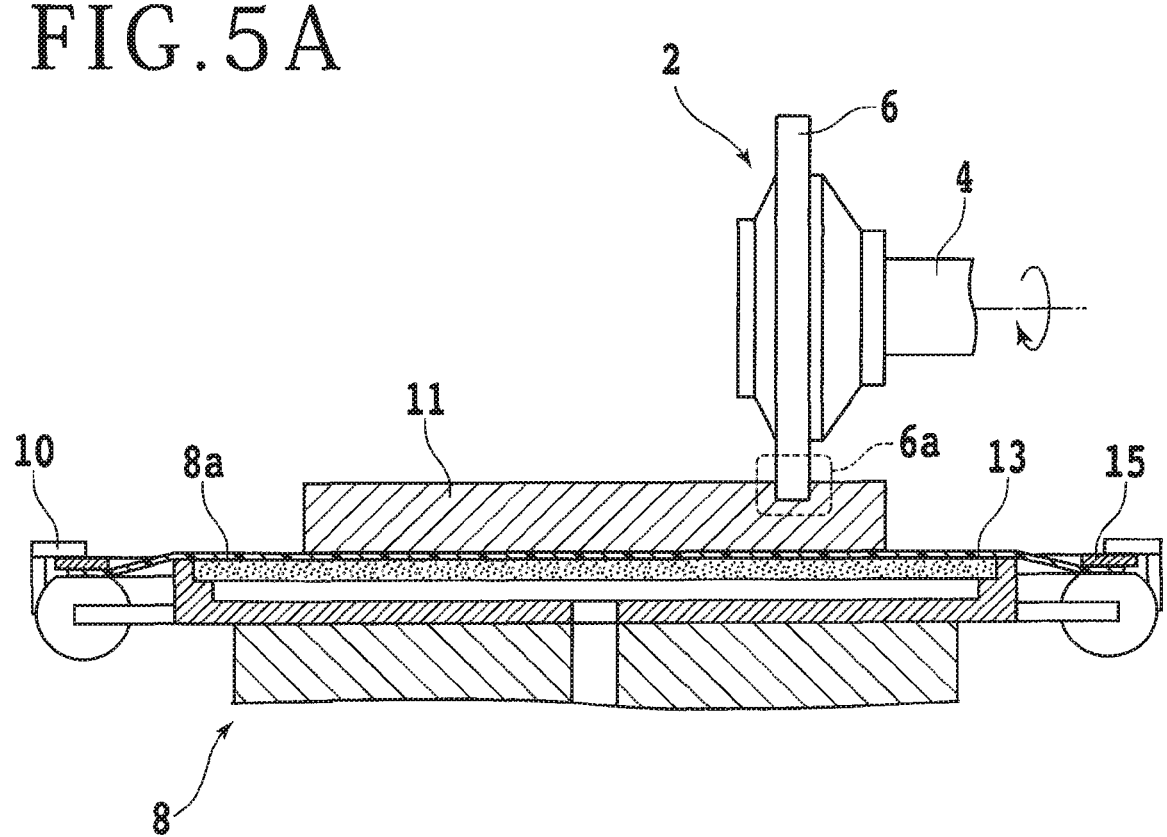
FIG. 5A is a partial sectional side view schematically depicting how a second cutting step is carried out.

By the above-described first cutting step, the cutting blade 6 is shaped in such a manner that the region of roundness is reduced. Next, the second cutting step is carried out subsequently to the first cutting step. In the second cutting step, cutting is carried out with tracing of the cut groove 11a formed in the dressing board 11 in the first cutting step. FIG. 5A is a partial sectional side view schematically depicting how the second cutting step is carried out. In the second cutting step, the spindle 4 is rotated and the cutting unit 2 is further lowered to a height at which the cutting blade 6 cuts into the groove bottom of one cut groove 11a formed in the dressing board 11. Thereafter, processing feed is carried out to cut the dressing board 11.

Figure 5B:
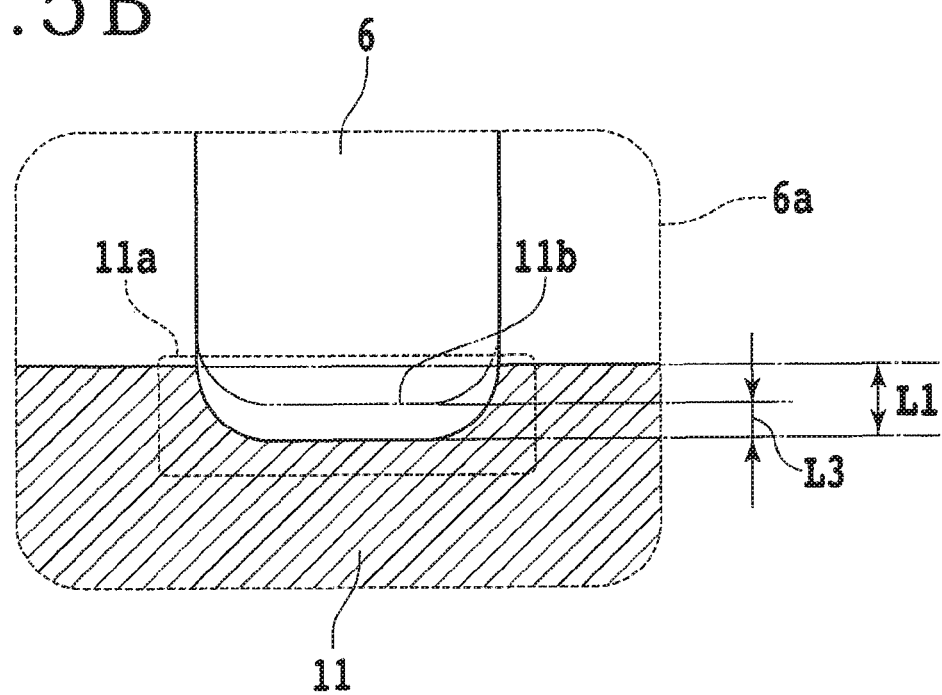
FIG. 5B is an enlarged view of a contact part between the region of the tip of the cutting blade and the dressing board in the second cutting step.

FIG. 5B is an enlarged view of a contact part between the region 6a of the tip of the cutting blade 6 and the dressing board 11 in the second cutting step. The position of the cutting unit 2 is set in such a manner that the cutting blade 6 cuts into the groove bottom of the cut groove 11a with a cutting depth that does not surpass the length of the region of roundness in the cutting blade 6 in the radial direction of the cutting blade 6. More specifically, as depicted in FIG. 5B, the cutting unit 2 is lowered in such a manner that L1>L3 is satisfied when the distance from a groove bottom 11b of the cut groove 11a formed by the first cutting step to the tip of the cutting blade 6 is defined as L3. The value of L3 can be set as appropriate according to the value of L1 similarly to the value of L2. An example of the value of L3 is approximately 1 to 50 μm. The thickness of the dressing board 11 is set to a thickness with which the cutting blade 6 does not reach the lower surface of the dressing board 11 in the second cutting step, i.e. a value larger than L2+L3 (see FIG. 3B and FIG. 5B).

Thereafter, processing feed is carried out in such a manner that the cut groove 11a formed in the dressing board 11 and the axial center of the spindle 4 relatively move (FIG. 4). Thereby, cutting is further carried out on the groove bottom 11b of one cut groove 11a in such a manner that the cut groove 11a formed in the first cutting step is traced. The cutting in the second cutting step is carried out in such a manner that the cutting blade 6 does not protrude from the cut groove 11a formed in the first cutting step.

Figure 6:
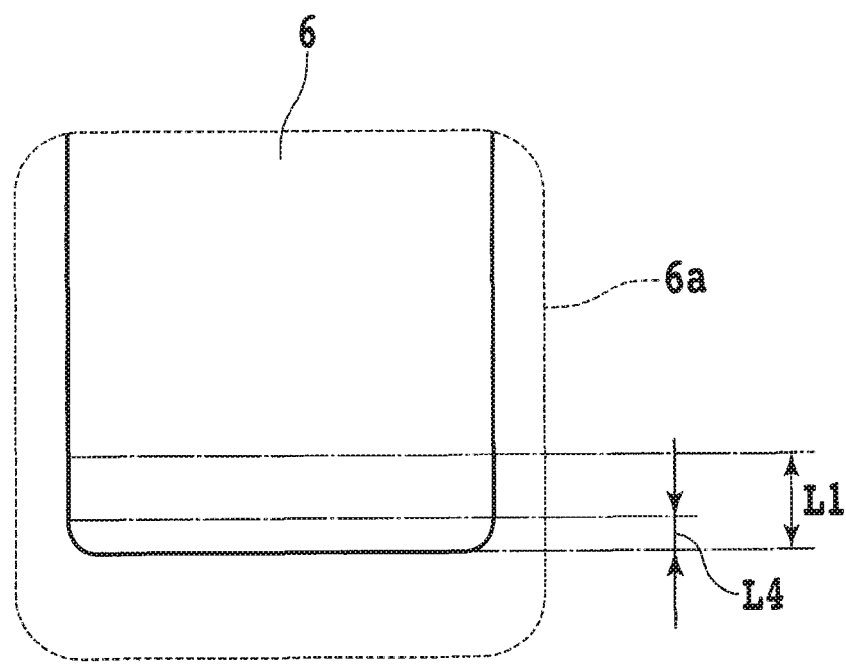
FIG. 6 is an enlarged view of the region of the tip of the cutting blade after the completion of the second cutting step.

By the above-described second cutting step, the cutting blade 6 is shaped in such a manner that the region of roundness is further reduced. FIG. 6 is an enlarged view of the region 6a of the tip of the cutting blade 6 after the completion of the second cutting step. A length L4 of the region of roundness after the dressing by the first cutting step and the second cutting step in the radial direction of the cutting blade 6 is smaller than a length L1 of the region of roundness before this dressing. That is, the cutting blade 6 is shaped to reduce the region of roundness by the first cutting step and the second cutting step.

By the above-described first cutting step and second cutting step, plural times of cutting are carried out in the same region in the dressing board 11. Thus, processing of so-called multi-step cutting is carried out and the dressing board 11 can be saved. Furthermore, the chuck table 8 is moved in the direction perpendicular to the axial center of the spindle 4 in the above-described first cutting step and second cutting step. This operation is the same as operation of normal processing feed when a workpiece is cut by using the cutting unit 2. For this reason, there is no need to cause the processing apparatus to carry out special operation like that disclosed in Japanese Patent Laid-open No. 2010-588, and the dressing can be easily carried out. The cutting with tracing of the cut groove 11a may be carried out two or more times. That is, after the above-described second cutting step, the groove bottom of the cut groove 11a may be further cut. This can further reduce the area of the region in which the dressing board 11 is cut.

Preferably, a determination step is carried out subsequently to the second cutting step. The determination step is a step of determining whether or not to continue the shaping of the cutting blade 6 based on the shape of the region 6a of the tip of the cutting blade 6. In the determination step, the shape of the region of roundness at the tip of the cutting blade 6 is measured and whether or not to continue the dressing is determined based on this shape. Specifically, when it is determined that the region of roundness has been sufficiently reduced, the dressing is ended. On the other hand, if it is determined that the reduction in the region of roundness at the tip is insufficient, the dressing is continued by carrying out the above-described first cutting step or second cutting step again.

This determination is carried out by determining whether or not the shape of the region of roundness at the tip of the cutting blade 6 satisfies a predetermined condition. Specifically, if the shape of the region of roundness satisfies the predetermined condition, it is determined to end the shaping of the cutting blade. If the shape of the region of roundness does not satisfy the predetermined condition, it is determined to continue the shaping of the cutting blade. The condition of the shape of the region of roundness used for the above-described determination can be freely set. For example, that the length L4 of the region of roundness after shaping of the cutting blade 6, depicted in FIG. 6, is equal to or smaller than a predetermined value may be employed as the condition, or that the radius of curvature of a curved surface which this region of roundness has is equal to or smaller than a predetermined value may be employed as the condition. Furthermore, the observation method of the shape of the tip of the cutting blade 6 is not particularly limited. For example, the shape of the tip of the cutting blade 6 can be checked by causing the cutting blade 6 to cut into a workpiece to form a groove for detection and measuring the shape of this groove for detection.

In the case of continuing the dressing based on the above-described determination, either the first cutting step or the second cutting step can be selected. Specifically, when the dressing is continued, the cutting blade 6 may be caused to cut into a region in which the cut groove 11a has not been formed in the dressing board 11 and the dressing board 11 may be cut (first cutting step). Alternatively, the dressing board 11 may be cut with tracing of the cut groove 11a formed in the dressing board 11 (second cutting step). Then, after the first cutting step or the second cutting step is repeated a predetermined number of times, the shape of the tip of the cutting blade 6 is observed again and whether to continue the dressing of the cutting blade 6 or to end the dressing is determined.

Figure 7:
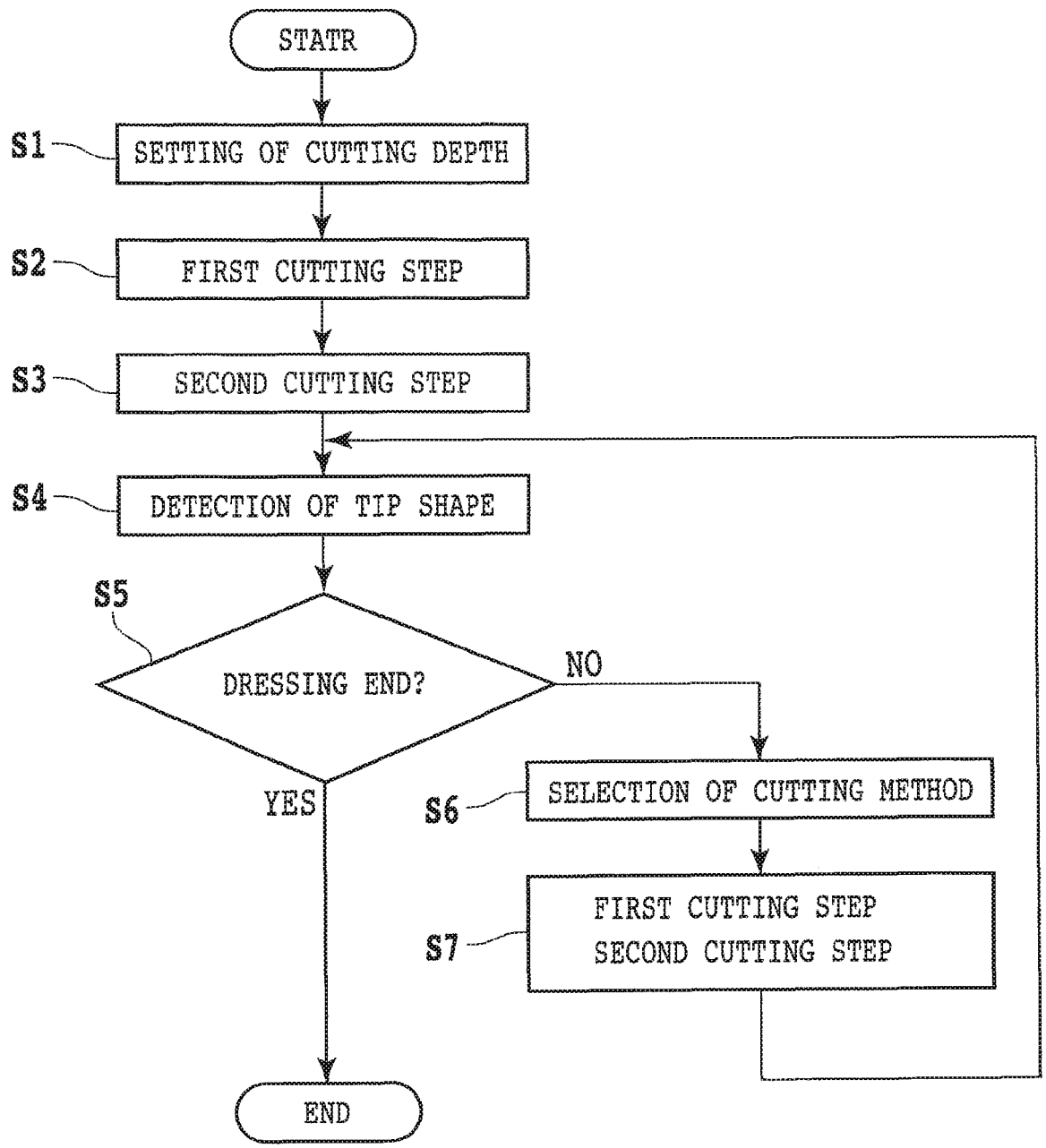
FIG. 7 is a flowchart depicting an example of a dressing process.

By the above determination step, the dressing can be carried out until the cutting blade 6 has a desired shape. Next, a concrete example of a series of dressing process including the above-described first cutting step, second cutting step, and determination step will be described. FIG. 7 is a flowchart depicting the example of the dressing process.

First, the depths with which the cutting blade 6 is caused to cut into the dressing board 11 are set. Specifically, the values of L2 in FIG. 3B and L3 in FIG. 5B are set (step S1). The values of L2 and L3 can be set based on the shape of the tip of the cutting blade 6, particularly the length L1 of the region of roundness. The values of L2 and L3 may be either identical or different.

Next, by the first cutting step, the cutting blade 6 is caused to cut into the dressing board 11 with the depth set in the step S1 (L2) to carry out shaping of the cutting blade 6 (step S2). Thereby, the cut groove 11a with a straight line shape is formed in the dressing board 11. Thereafter, by the second cutting step, the cutting blade 6 is caused to cut into the groove bottom of the cut groove 11a with the depth set in the step S1 (L3) to carry out shaping of the cutting blade 6 (step S3). Next, the shape of the tip of the cutting blade 6 that has gone through the first cutting step and the second cutting step is detected (step S4). Then, by the determination step, whether or not to continue the shaping of the cutting blade 6 is determined based on the shape of the tip of the cutting blade 6 (step S5). If further shaping is unnecessary, the dressing is ended (YES in the step S5). On the other hand, if the shaping is insufficient, the dressing is continued (NO in the step S5).

In the case of continuing the dressing, whether to cut a region in which the cut groove 11a has not been formed in the dressing board 11 or to carry out cutting with tracing of the cut groove 11a is selected (step S6), and the first cutting step or the second cutting step is carried out in accordance with this selection (step S7). Thereafter, the shape of the tip of the cutting blade 6 is detected again (step S4) and whether or not the dressing is necessary is determined anew (step S5).

In FIG. 7, the example is depicted in which the tip shape is detected after the first cutting step and the second cutting step are carried out one time for each (steps S2, S3, and S4). However, each of the first cutting step and the second cutting step may be carried out plural times before this detection of the tip shape. In this case, the number of times of the first cutting step and the number of times of the second cutting step may be either identical or different. Furthermore, the second cutting step may be consecutively carried out plural times and two or more times of cutting may be carried out on one cut groove 11a. Moreover, in the step S7, the first cutting step may be carried out plural times or the second cutting step may be carried out plural times. In addition, in the step S7, both the first cutting step and the second cutting step may be carried out the predetermined number of times for each. Furthermore, in FIG. 7, the setting of the cutting depths is carried out in the step S1. However, the cutting depth may be reset as appropriate in the step S2 or a subsequent step.

As above, in the one aspect of the present invention, processing of multi-step cutting in which the first cutting step and the second cutting step are carried out is executed. This can save the dressing board 11 while reducing the region of roundness at the tip of the cutting blade. Furthermore, in the first cutting step and the second cutting step, the chuck table 8 is moved in the direction perpendicular to the axial center of the spindle 4. Thus, the tip shape can be easily corrected without using complicated software and mechanism.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A dressing method of a cutting blade in which a plate-shaped dressing board is cut by the cutting blade mounted to a spindle and the cutting blade is shaped to reduce a region of roundness at a tip of the cutting blade, the dressing method comprising:
    a first cutting step of causing the cutting blade to cut into the dressing board held by a holding surface of a chuck table with a cutting depth that does not surpass a length of the region of roundness in a radial direction of the cutting blade, and relatively moving the chuck table and the cutting blade in a direction that is parallel to the holding surface and is perpendicular to an axial center of the spindle to form a cut groove in the dressing board; and
    a second cutting step of causing the cutting blade to further cut into a groove bottom of the cut groove formed in the first cutting step with a cutting depth that does not surpass the length of the region of roundness in the radial direction of the cutting blade, and relatively moving the chuck table and the cutting blade in the direction that is parallel to the holding surface and is perpendicular to the axial center of the spindle to carry out cutting on the groove bottom with tracing of the cut groove.

2. The dressing method of a cutting blade according to claim 1, the dressing method further comprising:
    a determination step of measuring a shape of the region of roundness in the cutting blade after the second cutting step is carried out and determining to end shaping of the cutting blade if the shape of the region of roundness satisfies a predetermined condition, and determining to carry out the first cutting step or the second cutting step if the shape of the region of roundness does not satisfy the predetermined condition.

* * * * *